(12) United States Patent
Guemmer et al.

(10) Patent No.: US 8,020,296 B2
(45) Date of Patent: Sep. 20, 2011

(54) METHOD FOR THE PRODUCTION OF SECONDARY FLUID DUCTS

(75) Inventors: Volker Guemmer, Blankenfelde-Mahlow (DE); Andreas Scholz, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1277 days.

(21) Appl. No.: 11/640,370

(22) Filed: Dec. 18, 2006

(65) Prior Publication Data

US 2007/0137034 A1    Jun. 21, 2007

(30) Foreign Application Priority Data

Dec. 19, 2005 (DE) .................. 10 2005 060 698

(51) Int. Cl.
*B23P 6/00* (2006.01)

(52) U.S. Cl. ............. 29/889.721; 29/889.72; 29/889.2; 416/232; 416/235; 416/231 R

(58) Field of Classification Search ............. 29/889.721, 29/889.7, 889.72, 889.2; 416/232, 235, 231 R
See application file for complete search history.

(56) References Cited

U.S. PATENT DOCUMENTS

| | | | | |
|---|---|---|---|---|
| 2,149,510 | A * | 3/1939 | Darrieus ................ | 416/90 R |
| 3,732,031 | A * | 5/1973 | Bowling et al. ........ | 416/97 R |
| 4,083,760 | A | 4/1978 | Puhr-Westerheide | |
| 4,672,727 | A * | 6/1987 | Field ..................... | 29/889.721 |
| 5,313,038 | A | 5/1994 | Kildea | |
| 6,234,752 | B1 | 5/2001 | Wei et al. | |
| 6,340,424 | B1 | 1/2002 | Elman et al. | |
| 6,644,920 | B2 * | 11/2003 | Beeck et al. ........... | 416/97 R |
| 7,204,019 | B2 | 4/2007 | Ducotey et al. | |
| 2002/0173238 | A1 * | 11/2002 | Kordonski et al. ..... | 451/36 |
| 2003/0037436 | A1 * | 2/2003 | Ducotey et al. ........ | 29/889.1 |
| 2003/0086785 | A1 | 5/2003 | Bunker et al. | |
| 2005/0133378 | A1 | 6/2005 | Glock et al. | |

FOREIGN PATENT DOCUMENTS

| | | |
|---|---|---|
| DE | 4428207 | 2/1996 |
| DE | 10214623 | 11/2003 |
| EP | 0978633 | 2/2000 |
| EP | 1286020 | 2/2003 |
| FR | 2767083 | 2/1999 |
| GB | 1516014 | 6/1978 |

OTHER PUBLICATIONS

German Search Report dated Aug. 9, 2007 from corresponding German patent application.
European Search Report dated Mar. 22, 2011 from corresponding European patent application.

* cited by examiner

*Primary Examiner* — Essama Omgba
*Assistant Examiner* — Christopher Besler
(74) *Attorney, Agent, or Firm* — Timothy J. Klima; Shuttleworth & Ingersoll, PLC

(57) ABSTRACT

A method for the production of secondary fluid ducts for a turbomachine, especially for fluid supply or fluid removal to/from a flow-wetted surface of the turbomachine, with the secondary fluid ducts being produced by an electrochemical machining process.

20 Claims, 5 Drawing Sheets

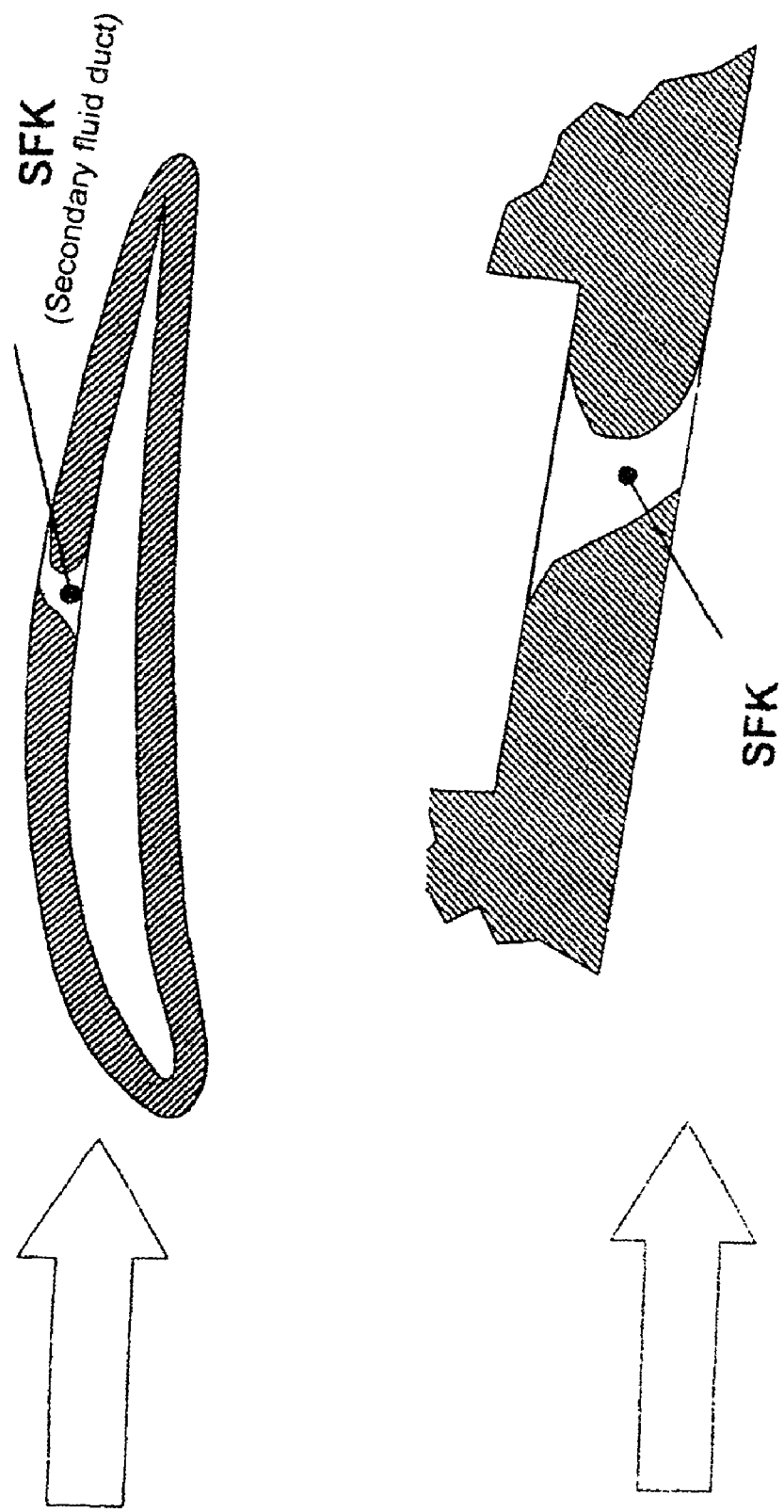

METHOD FOR THE PRODUCTION OF SECONDARY FLUID DUCTS

Figure 1B:
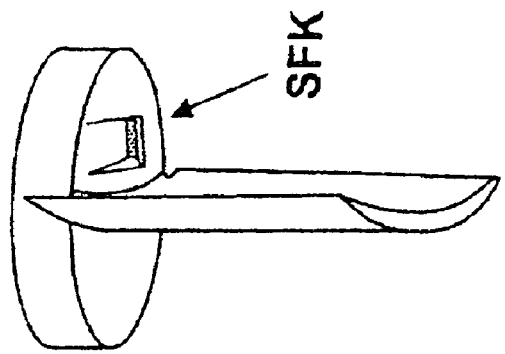
Figure 1B:
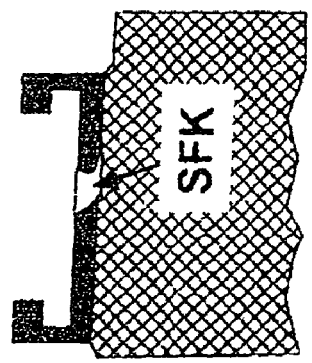
Figure 1B:
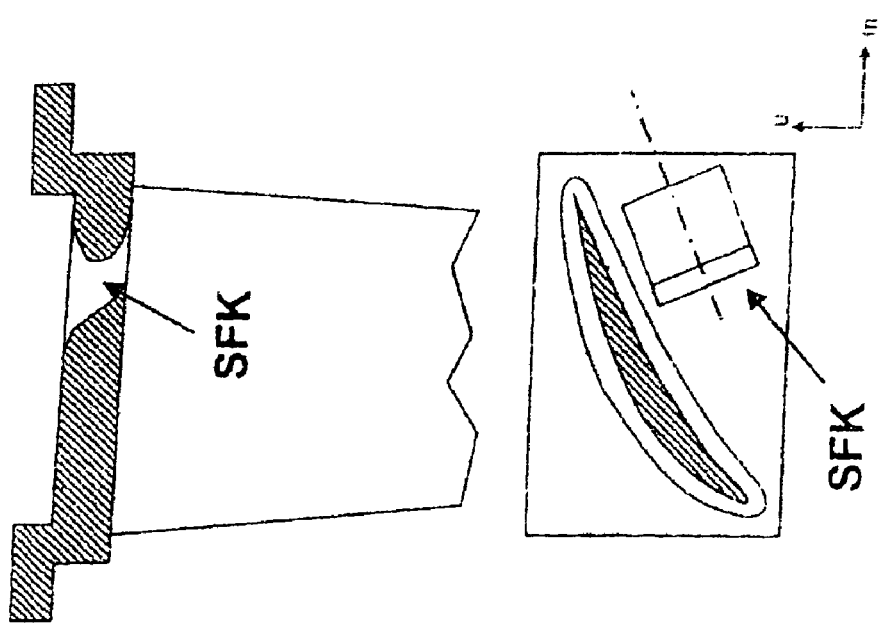

This application claims priority to German Patent Application DE 10 2005 060 698.9 filed Dec. 19, 2005, the entirety of which is incorporated by reference herein.

BACKGROUND OF THE INVENTION

This invention relates to items or components of installations or machines in static or dynamic contact with fluid. More particularly, the present invention relates to components of turbomachines flown or enveloped by fluid and to the components necessary for the supply and removal of fluid (working medium). The present invention covers the combination of essential features of the design of openings in said components and the application of advanced manufacturing methods for the realization of such openings.

The aerodynamic efficiency of turbomachines and machine components is determined by the growth and the separation of boundary layers forming along the wetted surfaces of the flow path.

In turbomachines, this applies to the surfaces of the blading and the surfaces of all hub and casing components. The boundary layers can be favorably influenced by the removal or supply of fluid at aerodynamically critical locations. Fluid removal and fluid supply requires the provision of openings in the surfaces of the blade and/or the hub and casing walls wetted by the main flow. These openings, hereinafter referred to as "secondary fluid ducts" (SFK), usually connect to a chamber which is flown by small secondary fluid quantities and is provided within the hollow-type blade or within the hub or casing. Openings with simple shapes according to the state of the art and producible according to the state of the art perform inaccurately and employ excessive secondary fluid quantities and are, therefore, not sufficiently efficient.

In order to obtain high efficiency of said SFK, a geometrically complex shape with high accuracy requirements must be adopted which are not, or not fully, producible with conventional cutting or forming methods. This applies, for example, if a SFK is employed to provide an accurate supply of secondary fluid to the main flow to stabilize the respective boundary layer and to guide this secondary fluid closely along the surface concerned.

The state of the art is disadvantageous in that the openings in items or components of installations or machines with complex shape, orientation and contour accuracy are not producible by conventional cutting processes. This applies, In particular, if the entirety of contours to be generated is not totally producible from one side of the item.

The cross-section of a SFK in components of turbomachines can, for example, have the shape of a curved nozzle. Reasons for the inability of the state of the art to provide the quality required of the SFK are its small size and its frequently oblique or curved orientation within the surrounding material.

DESCRIPTION OF THE INVENTION

The present invention, in a broad aspect, provides a method for the production of secondary fluid ducts of the type specified above which enables complex geometries of secondary fluid ducts to be produced, while being simply designed and easily and safely performable.

It is a particular object of the present invention to provide solution to the above problems by a combination of the features described herein. Further advantageous embodiments of the present invention will be apparent from the description below claims.

Therefore, in accordance with the present invention, the secondary fluid duct is produced by means of an electrochemical machining process. Such a process enables the most complex geometries to be simply and reproducibly generated, as described hereinafter.

In a particularly favorable development of the present invention, at least two contour electrodes are used which are fed or sunk from different sides into the item to be provided with the secondary fluid duct. Either a recess or opening may here be initially produced by electrochemical machining or another process and the contour electrodes employed to generate only the geometrical surface shape of the secondary fluid duct or the contour electrodes may be used to machine the secondary fluid duct from the solid material.

It is particularly favorable if the wall of the secondary fluid duct is smoothed after electrochemical machining. Smoothing can preferably be accomplished by a super finishing or super polishing process. Here, the use of a fluid containing abrasive matter is particularly favorable.

In accordance with the present invention, the required SFK is generated in the wall between the secondary air accumulator and the main flow by means of electrochemical machining (ECM) or the so-called precision electrochemical machining (PECM). This is independent of the material and the wall thickness. In order to obtain the desired shape of the SFK, the contour on the accumulator side and the contour on the main flow side must be generated separately. The shape of the two contour electrodes required is correspondingly defined. In accordance with the present invention, the separately produced contour sections smoothly merge into the overall shape of the SFK.

After production of the SFK by ECM or PECM, a so-called super finishing process, also known under the term of super polishing, can further improve the flow conditions. The abrasive effect of the fluid will further reduce irregularities caused by machining and round edges.

In the following, embodiments of the present invention are more fully described in light of the accompanying drawings. In the drawings, FIG. 1a shows examples of secondary fluid ducts in components of turbomachines, FIG. 1b shows examples of secondary fluid ducts in hub and casing-side boundary walls of the flow path of turbomachines, FIG. 1c shows examples of inserts with secondary fluid ducts in components of turbomachines, FIG. 2a shows a curved secondary fluid duct featuring the shape of a nozzle, and indicates its main dimensions, FIG. 2b shows a curved secondary fluid duct featuring the shape of a nozzle, and indicates its shaping concept.

FIG. 1a schematically shows two examples of secondary fluid ducts in components of turbomachines. In the upper part of the Figure, a rotor or stator blade is shown in sectional view which features an inner cavity and a SFK in the outer wall. The blade may, of course, have more than one cavity and further SFK not shown here. In the lower part of the Figure, a section of a hub-side or casing-side flow path boundary is shown whose wall is provided with a SFK. Of course, the wall may have further SFK not shown here. A possible direction of the enveloping fluid flow is indicated by a bold arrow each.

Figure 2A:
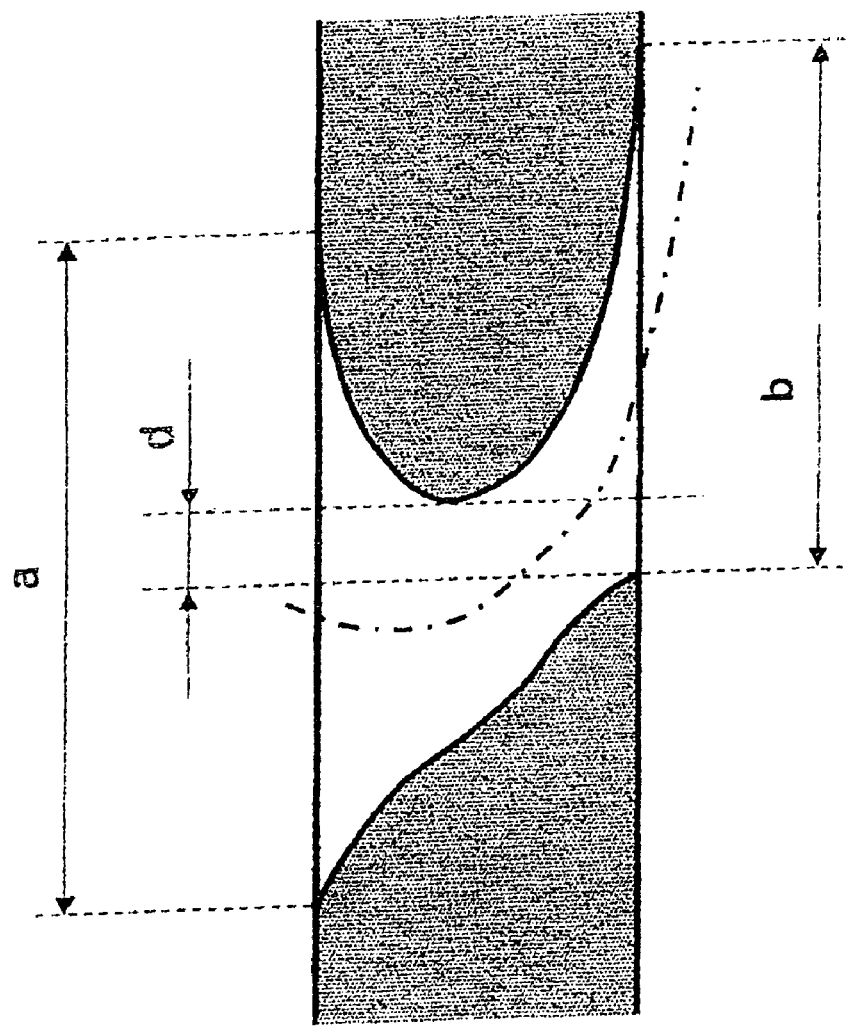
Figure 2B:
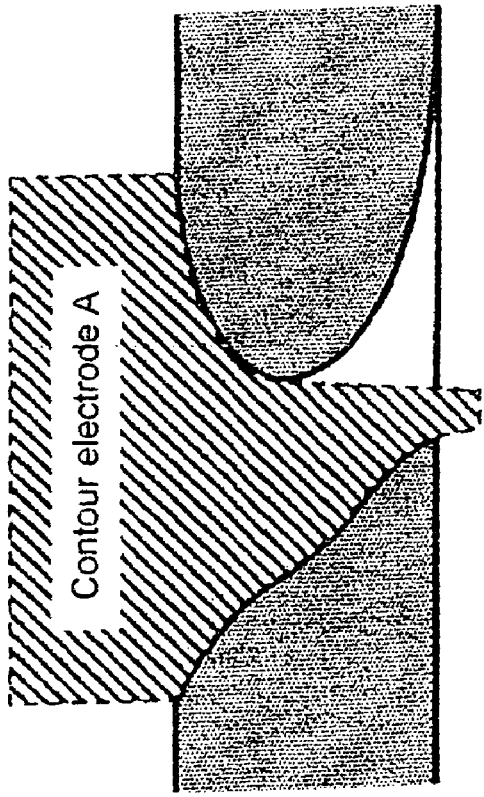

FIG. 1b shows, in schematic representation, two further examples of secondary fluid ducts (SFK) in hub-side and casing-side boundary walls of the flow path of turbomachines. In the left-hand half of the Figure, a blade with circumferential root is shown (top: side view with section through the platform; bottom: top view with section through the blade at bottom) whose platform is provided with a SFK, here a curved nozzle orientated obliquely to the meridional direction, beside the blade, within the platform. In the right-hand half of the Figure, a blade with rotary base and trunnion is shown (sectional and perspective side view). Within the hollow rotary base body, a SFK is provided, here again an obliquely oriented, curved nozzle beside the blade.

Figure 1C:
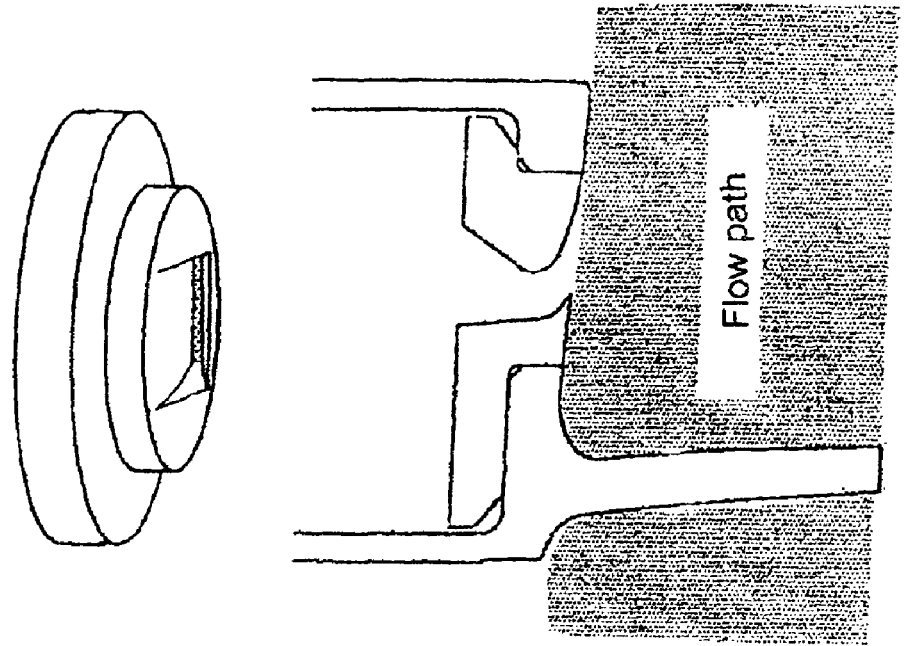
Figure 1C:
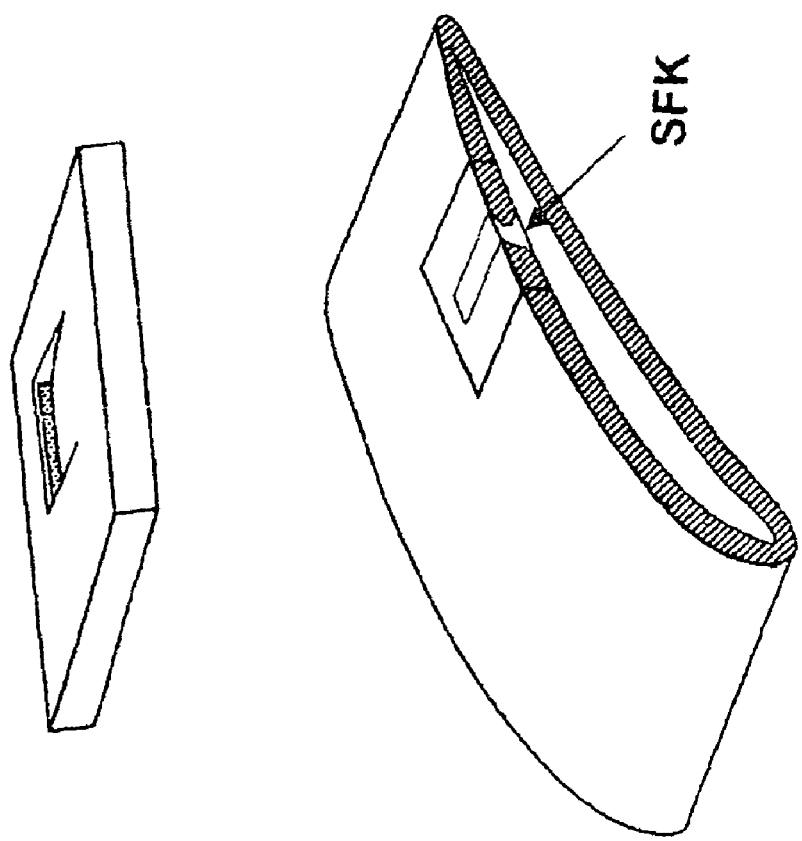

Finally, FIG. 1c schematically shows examples of inserts with secondary fluid duct in components of turbomachines. In the left-hand half of the Figure, the section of a hollow blade and a separately produced insert are shown in perspective view. In the right-hand half of the Figure, a section through a hollow root of a blade and the insert provided therein is shown. The insert may have any shape and be joined to the remainder of the blade structure by any method.

In the special case of turbomachines, the essential design feature of the present invention is the integration of a SFK with the geometry of the surfaces of the blading or the hub and casing components. Here, it may be particularly favorable to select the shape of a nozzle style of SFK for the guidance of the secondary air mass flow. If fed into the main flow, the secondary fluid must be introduced tangentially to the component surface. As shown in FIG. 2a, the secondary fluid flow, which approaches approximately transversely to the main flow, is accelerated by a curved shape of nozzle and directed in accordance with said requirements.

The contour (recess) and the geometrical dimensions of the SFK together with the high requirements on surface quality rule out the use of conventional manufacturing methods, such a drilling and milling.

The SFK is characterized by a few main dimensions. Accordingly, the SFK has an inner opening width a, an outer opening width b and a projected opening width d. Here, a and b are always larger than d. Although d can assume negative values, positive values of d are particularly favorable as regards functionality and producibility.

The dimensions of a, b and d often lie within, or clearly below, a few millimeters. The surface finish to be obtained should be better than $R_a$=1.6 µm.

FIG. 2b shows the sequence of two operations using a contour electrode A (left-hand half of FIG. 2b) and a subsequently inserted contour electrode B. For clarity, the left-hand half of FIG. 2b shows the overall cross-section of the secondary fluid duct to be produced. Obviously, if the contour electrode A and the contour electrode B are used in sequence, the contour electrode B will work as shown in the right-hand half of FIG. 2b.

In accordance with the present invention, it is also possible to design both contour electrodes for simultaneous use.

After production of the SFK by ECM or PECM, a so-called super finishing process, also known under the term of super polishing, can further improve the flow conditions. The abrasive effect of the fluid will further reduce irregularities caused by machining and round edges. Differences between adjacent portions of the secondary fluid duct machined by the first and second contour electrodes are smoothed by super polishing using a fluid containing abrasive particles.

The present invention enables geometrically small and complex openings in component walls to be cost-effectively produced in accordance with the aerodynamic requirements.

With regard to the design of an aero-engine compressor, the new production method enables the design/manufacturing effort required for a given aerodynamic configuration and effect to be significantly reduced. On the example of a hollow-type compressor blade with secondary fluid ducts, a cost reduction of 5 to 25 percent appears to be realizable. Furthermore, the production of secondary fluid ducts by the method described improves the reliability of the component concerned.

What is claimed is:

1. A method for producing a secondary fluid duct for a turbomachine, comprising:
the secondary fluid duct passing from a first side of a component to a second side, the secondary fluid duct having a contoured surface throughout including a first cross-section at the first side, a second cross-section and a third cross-section positioned between and being smaller than the first and second cross-sections, the second cross-section being positioned between the third cross-section and the second side;
forming the first cross-section, a portion of the third cross-section, and the contoured surface therebetween by an electrochemical machining process with a first contour electrode fed from the first side;
forming at least a portion of the second cross-section, a portion of the third cross-section, and the contoured surface therebetween, by an electrochemical machining process with a second contour electrode fed from the second side;
configuring the first contour electrode and the second contour electrode to produce their respective contoured sections to smoothly merge together; and
forming a portion of the second cross-section with the first contour electrode.

2. A method in accordance with claim 1, wherein a wall of the secondary fluid duct is smoothed after electrochemical machining.

3. A method in accordance with claim 2, wherein the wall of the secondary fluid duct is smoothed after electrochemical machining by super polishing using a fluid containing abrasive particles.

4. A method in accordance with claim 3, wherein the secondary fluid duct is for at least one of fluid supply to and fluid removal from a flow-wetted surface of the turbomachine.

5. A method in accordance with claim 1, wherein the secondary fluid duct is for at least one of fluid supply to and fluid removal from a flow-wetted surface of the turbomachine.

6. A method in accordance with claim 2, wherein the secondary fluid duct is for at least one of fluid supply to and fluid removal from a flow-wetted surface of the turbomachine.

7. A method in accordance with claim 1, wherein the first contour electrode has a different working shape than the second contour electrode.

8. A method in accordance with claim 7, wherein a wall of the secondary fluid duct is smoothed after electrochemical machining.

9. A method in accordance with claim 8, wherein the wall of the secondary fluid duct is smoothed after electrochemical machining by super polishing using a fluid containing abrasive particles.

10. A method in accordance with claim 8, wherein differences between adjacent portions of the secondary fluid duct machined by the first and second contour electrodes are smoothed by super polishing.

11. A method in accordance with claim 7, wherein each contour electrode machines a separate portion of the secondary fluid duct inaccessible by the other contour electrode.

12. A method in accordance with claim 11, wherein differences between adjacent portions of the secondary fluid duct machined by the first and second contour electrodes are smoothed by super polishing using a fluid containing abrasive particles.

13. A method in accordance with claim 1, wherein differences between adjacent portions of the secondary fluid duct machined by the first and second contour electrodes are smoothed by polishing.

14. A method in accordance with claim 13, wherein the differences between adjacent portions of the secondary fluid duct machined by the first and second contour electrodes are smoothed by super polishing using a fluid containing abrasive particles.

15. A method in accordance with claim 14, wherein the first contour electrode and the second contour electrode are fed sequentially.

16. A method in accordance with claim 14, wherein the first contour electrode and the second contour electrode are fed simultaneously.

17. A method in accordance with claim 1, wherein the first contour electrode and the second contour electrode are fed sequentially.

18. A method in accordance with claim 1, wherein the first contour electrode and the second contour electrode are fed simultaneously.

19. A method in accordance with claim 1, wherein the second cross-section is at the second side.

20. A method in accordance with claim 14, wherein the second cross-section is at the second side.

* * * * *